(12) United States Patent
Tomura et al.

(10) Patent No.: US 7,842,633 B2
(45) Date of Patent: Nov. 30, 2010

(54) HIGH-RESISTANCE HIGH-ZIRCONIA CAST REFRACTORY MATERIAL

(75) Inventors: Nobuo Tomura, Tokyo (JP); Shigeo Endo, Tokyo (JP); Yasuo Misu, Tokyo (JP)

(73) Assignee: Saint-Gobain TM K.K., Tokyo (JP)

( * ) Notice: Subject to any disclaimer, the term of this patent is extended or adjusted under 35 U.S.C. 154(b) by 156 days.

(21) Appl. No.: 12/314,713

(22) Filed: Dec. 16, 2008

(65) Prior Publication Data
US 2009/0176642 A1 Jul. 9, 2009

(30) Foreign Application Priority Data
Dec. 26, 2007 (JP) .............................. 2007-334026

(51) Int. Cl.
*C04B 35/484* (2006.01)
(52) U.S. Cl. ....................................... 501/105; 501/107
(58) Field of Classification Search ................. 501/104, 501/105, 107
See application file for complete search history.

(56) References Cited
U.S. PATENT DOCUMENTS
7,598,195 B2 * 10/2009 Gupta et al. ................ 501/105
7,655,587 B2 * 2/2010 Boussant-Roux et al. ... 501/105
7,687,422 B2 * 3/2010 Boussant-Roux et al. ... 501/105

FOREIGN PATENT DOCUMENTS
| | | |
|---|---|---|
| JP | 63-285173 | 11/1988 |
| JP | 04-193766 | 7/1992 |
| JP | 08-048573 | 2/1996 |
| JP | 08-277162 | 10/1996 |
| JP | 10-057968 | 3/1998 |
| WO | WO 2005/068393 | 7/2005 |

* cited by examiner

*Primary Examiner*—Karl E Group
(74) *Attorney, Agent, or Firm*—Bacon & Thomas, PLLC

(57) ABSTRACT

A high-zirconia cast refractory material which contains 85-95 wt % of $ZrO_2$, 4-12 wt % of $SiO_2$, 0.1 to less than 0.8 wt % of $Al_2O_3$, less than 0.04 wt % of $Na_2O$, 0.01-0.15 wt % of $K_2O$, 0.1-1.5 wt % of $B_2O_3$, 0.01-0.2 wt % of CaO, less than 0.4 wt % of BaO, less than 0.2 wt % of SrO, 0.05-0.4 wt % of $Y_2O_3$, and 0.3 wt % or less of $Fe_2O_3$ and $TiO_2$ together, but does not substantially contain CuO and $P_2O_5$ (less than 0.01 wt %), such that the molar ratio of the glass-forming oxides (such as $SiO_2$ and $B_2O_3$) to the glass-modifying oxides (such as $Na_2O$, $K_2O$, CaO, MgO, SrO, and BaO) is 20-100, said refractory material having an electric resistance being 200 Ω·cm or higher after standing for 12 hours at 1500° C.

10 Claims, 3 Drawing Sheets

HIGH-RESISTANCE HIGH-ZIRCONIA CAST REFRACTORY MATERIAL

BACKGROUND OF THE INVENTION

1. Field of the Invention

The present invention relates to a high-resistance high-zirconia cast refractory material suitable for glass melting furnaces. More particularly, the present invention relates to a high-resistance high-zirconia cast refractory material excelling in thermal cycle stability and free from peeling during heating (at about 500° C.) and also exhibiting a remarkably high electric resistance at high temperatures.

2. Description of the Related Art

Among conventional common refractory materials for glass melting furnaces is a cast refractory material rich with $ZrO_2$ (zirconia or zirconium oxide). This is because $ZrO_2$ is a metal oxide having a high resistance to corrosion by molten glass. An example of such cast refractory materials is a high-zirconia cast refractory material containing no less than 80 wt % $ZrO_2$.

The high-zirconia cast refractory material exhibits good corrosion resistance for molten glass of any kind on account of its high $ZrO_2$ content and its compact structure. In addition, it causes no defects (such as stone and cord) to molten glass because it forms no reaction layer on its interface with molten glass. Consequently, the high-zirconia cast refractory material is suitable for production of high-quality glass.

The high-zirconia cast refractory material has a mineral composition consisting mainly of zirconia crystals of monoclinic system, with their grain boundaries being filled with a small amount of glass phase.

On the other hand, the zirconia crystals are known to undergo reversible transformation in crystal system (between monoclinic and tetragonal) accompanied by a steep volume change at about 1150° C. The volume change due to transformation generates stresses, but they are relieved as the glass phase flows. This permits regular production of a high-zirconia cast refractory material free from cracking in the casting process. However, the high-zirconia cast refractory material containing a small amount of glass phase greatly varies in its characteristic properties depending on the amount and kind of the constituents of the glass phase.

Glass is usually composed of the following constituents, which are classified into three groups.

Oxides such as $SiO_2$, $B_2O_3$, and $P_2O_5$, which vitrify by themselves. They are referred to as glass-forming oxides or "glass former". $SiO_2$ glass forms a network structure consisting of Si—O—Si linkages.

Alkali metal oxides such as $Na_2O$ and alkaline earth metal oxides such as CaO, which are referred to as glass modifying oxides or "glass modifier". They easily enter the interstices of the network structure.

Other oxides such as $Al_2O_3$ and $TiO_2$, which have the intermediate properties of the above-mentioned oxides. They are referred to as intermediate oxides or "intermediate". Intermediate acts as either glass former or glass modifier.

The network structure consisting of glass-forming oxides varies depending on the modifying oxides. In other words, glass will vary in its characteristic properties, such as viscosity, transition temperature, and electric resistance, depending on the amount of modifying oxides (or the ratio of Former to Modifier).

Meanwhile, alkali-free glass for liquid crystal panel (LCD) needs a higher electric resistance than conventional one for its improved performance. Therefore, it should be produced by using a melting furnace lined with a high-zirconia refractory material which has a high electric resistance.

However, the conventional high-resistance refractory material is uncertain about its electric resistance which is measured as soon as a predetermined temperature has been reached or after standing for several hours at a predetermined temperature. The value of electric resistance measured in this manner apparently lacks stability and consistency.

That is, a sample of high-zirconia cast refractory material may increase in electric resistance after standing for a long time. To be specific, the electric resistance measured after standing at 1500° C. for 12 hours equals 160% of the value measured immediately after heating to 1500° C. This is due to precipitation of zircon in glass phase or precipitation of zircon (with a high electric resistance) around zirconia crystals (with a low electric resistance), which results in the high-zirconia cast refractory material increasing in electric resistance.

Precipitation of zircon helps increase electric resistance as mentioned above but causes cracking and powdering during thermal cycle as mentioned later; therefore, it is not desirable for high-zirconia cast refractory materials.

The foregoing has aroused a demand for a high-zirconia cast refractory material that maintains a high electric resistance stably at high temperatures.

The fact that conventional high-zirconia cast refractory materials constituting a glass melting furnace sometimes chip off at corners or peel off (conchoidally) from the furnace inside at the time of furnace heating has also aroused a demand for a high-zirconia cast refractory material that remains stable without peeling during heating.

Once a high-zirconia cast refractory material is damaged, damaged parts are extremely vulnerable to corrosion by molten glass. This poses a problem with such defects as stone and cord in molten glass.

It is known that peeling that occurs at the time of heating mostly arises from residual stress and pitlike defects present in the surface of the product. Residual stress in the product may be compressive stress or tensile stress.

Compressive stress is defined as a convergent force toward a point in the refractory material and tensile stress is defined as a divergent force from a point in the refractory material.

In general, a refractory material expands in its surface upon heating, thereby giving rise to a compressive stress opposite to expansion. This compressive stress combines with residual stress (which may be compressive one) to produce a force that acts on the surface of the high-zirconia cast refractory material. This force is large enough to cause peeling at the time of heating even though the residual stress is comparatively small. Consequently, the residual stress should preferably be as small as possible and be tensile one rather than compressive one.

Refractory products usually have pitlike surface defects that occur when the melt is cast into a mold. Such defects also cause peeling at the time of heating.

When acted on by the resulting force of residual stress and stress due to heating, the part adjacent to pitlike defects, which is weaker than the compact part, may peel off at the time of heating.

In fact, pitlike defects are often found in the part where peeling has occurred at the time of heating.

Most glass melting furnaces constructed of high-zirconia cast refractory materials are of burner combustion type. And, such furnaces are run, with burners switched at intervals of tens of minutes. The switching of burners raises or lowers the temperature of the surface of the cast refractory materials. This means that the cast refractory materials, which are used for several years, undergo heating cycles repeatedly. This is the reason why there has been a demand for a high-zirconia cast refractory material which remains stable to heating cycles.

It is important for stability toward heating cycles that the glass phase to absorb an abrupt volume change of zirconia crystals at about 1150° C. is not affected by heating cycles. The glass phase with zircon precipitating therein is unable to absorb the volume change of zirconia, and zirconia that has undergone heating cycle tests has a large permanent expansion coefficient. This results in the refractory material suffering cracking and powdering. There is the following relationship between stability of the glass phase and the permanent expansion coefficient measured after heating cycle tests.

The permanent expansion coefficient of the high-zirconia cast refractory material which has undergone heating cycle tests exceeds 10% if zircon precipitates in the glass phase, whereas it is no more than 10% if the glass phase remains stable without zircon precipitation.

Therefore, the high-zirconia cast refractory material should preferably have a permanent expansion coefficient no more than 10% after heating cycle tests.

The fact that part of the high-zirconia cast refractory material in which the glass phase is replaced by LCD glass has a permanent expansion coefficient of 3% to 7% after heating cycle tests suggests that good stability will be gained if the permanent expansion coefficient is identical in the high-zirconia cast refractory material and that part of the high-zirconia cast refractory material in which the glass phase is replaced by LCD glass.

It follows, therefore, that the high-zirconia cast refractory material should preferably have a permanent expansion coefficient no more than 5% after heating cycle tests.

Refractory materials having a high electric resistance are disclosed in Japanese Patent Laid-open Nos. Sho-63-285173, Hei-4-193766, Hei-8-48573, Hei-8-277162, and Hei-10-59768, and WO2005/068393.

Heat cycle stability is described in Japanese Patent Laid-open Nos. Hei-4-193766, Hei-8-48573, and Hei-8-277162. Prevention of surface peeling at the time of heating is described in Japanese Patent Laid-open Nos. Hei-8-48573 and Hei-8-277162.

The refractory material proposed in Japanese Patent Laid-open No. Sho-63-285173 is a high-resistance high-zirconia refractory material which contains at least one species of $K_2O$, $SrO$, $BaO$, and $Cs_2O$ in an amount being 1.5 wt % or less in place of $Li_2O$, $Na_2O$, $CaO$, $CuO$, $MgO$, and $P_2O_5$ which have a small ionic radius. This refractory material has a high electric resistance but does not contain CaO which is required to stabilize the glass phase. In addition, because of the absence of CaO, it has a large tensile stress and easily cracks when heated on one side.

The refractory material proposed in Japanese Patent Laid-open No. Hei-4-193766 is a high-zirconia electrocast refractory material which has a high electric resistance and is stable to heating cycles. It contains 1-3 wt % of $Al_2O_3$, 0.3-3 wt % of at least one species of BaO, SrO, and CaO, and 0-1.5 wt % of ZnO, and it does not contain $Na_2O$ and $K_2O$.

This refractory material, however, does not have a sufficiently high electric resistance because of the high content of $Al_2O_3$. Moreover, it is poor in heat cycle stability because of the lack of $Na_2O$ and $K_2O$.

The refractory material proposed in Japanese Patent Laid-open No. Hei-8-48573 is a high-zirconia electrocast refractory material which has a high electric resistance and is little vulnerable to surface peeling, with good stability toward repeated heating (or heating cycles). It contains more than 0.05 wt % of $Na_2O$ and 0.05-3 wt % of BaO, SrO, and MgO in total.

This refractory material, however, has a stable glass phase but does not have a sufficiently high electric resistance on account of the high content of $Na_2O$ exceeding 0.05 wt %.

In addition, it has a large permanent expansion coefficient, which is detrimental to heat cycle stability, when it contains BaO (alkaline earth metal oxide) in a large amount close to the upper limit (3 wt %).

It is claimed in the disclosure to have a surface residual stress being 80 MPa or smaller (as tensile force) and 50 MPa or smaller (as compressive force). Because of such a broad range of stress, it is subject to peeling at the time of heating if it has pitlike defects in its surface.

The refractory material proposed in Japanese Patent Laid-open No. Hei-8-277162 is a high-resistance high-zirconia electrocast refractory material which contains 0.05 wt % or more of $Na_2O$, 0.05-1 wt % of $Na_2O$ and $K_2O$ in total, 0.05-3 wt % of BaO and MgO in total, and 0.2 wt % or less of $P_2O_5$. It is stable to repeated heating (heat cycles) and is less subject to surface peeling.

However, because of the high content of $Na_2O$ (0.05 wt % or more), it does not have a sufficiently high electric resistance even though its glass phase is stable.

The refractory material proposed in Japanese Patent Laid-open No. Hei-10-59768 is a high-resistance high-zirconia electrocast refractory material which contains 0.05 wt % or more each of $Na_2O$ and $K_2O$ but does not contain alkaline earth metal oxides such as BaO. It is stable to repeated heating.

However, because of the lack of alkaline earth metal oxides, it needs to contain 0.05 wt % or more of $Na_2O$ to stabilize the glass phase. Consequently, it does not have a sufficiently high electric resistance.

The refractory material proposed in WO2005/068393 is a high-resistance high-zirconia electrocast refractory material which contains 0.8 wt % or more of $Al_2O_3$, less than 0.04 wt % of $Na_2O$, and less than 0.4 wt % of CaO.

However, because of its high content of $Al_2O_3$ (0.8 wt % or more), it does not have a sufficiently high electric resistance.

Incorporation with CaO to stabilize the glass phase needs careful control because excess CaO promotes the formation of zircon.

OBJECT AND SUMMARY OF THE INVENTION

It is an object of the present invention to provide a high-resistance high-zirconia cast refractory material which maintains a stable high electric resistance over a long time at high temperatures and which hardly peels off during heating and exhibits good stability toward repeated heating.

The foregoing object of the present invention is achieved by the high-zirconia cast refractory material defined in the appended claims 1 to 6.

The high-zirconia cast refractory material according to the present invention is characterized by a high electric resistance (200 Ω·cm or above after standing for 12 hours at 1500° C.), nonpeeling in the heating process, and good stability toward repeated heating.

When applied to glass melting furnaces, the high-zirconia cast refractory material according to the present invention permits production of defect-free glass products over an extended period of operation because of its high electric resistance and nonpeeling properties. Therefore, it is extremely useful in industry.

As the result of their extensive researches, the present inventors invented the high-zirconia cast refractory material which has a stable high electric resistance that changes very little with time at high temperatures and which hardly suffers peeling in the heating process and exhibits good stability to repeated heating. The high-zirconia cast refractory material contains 85-95 wt % of $ZrO_2$, 4-12 wt % of $SiO_2$, 0.1 to less than 0.8 wt % of $Al_2O_3$, less than 0.04 wt % of $Na_2O$, 0.01-0.15 wt % of $K_2O$, 0.1-1.5 wt % of $B_2O_3$, 0.01-0.2 wt % of CaO, less than 0.4 wt % of BaO, less than 0.2 wt % of SrO, 0.05-0.4 wt % of $Y_2O_3$, and 0.3 wt % or less of $Fe_2O_3$ and $TiO_2$ together, but does not substantially contain CuO and $P_2O_5$ (less than 0.01 wt %). Moreover, it contains the foregoing components such that the molar ratio of Former to Modifier is from 20 to 100. Former is defined as the glass forming oxides such as $SiO_2$ and $B_2O_3$, and Modifier is defined as the glass modifying oxides such as $Na_2O$, $K_2O$, CaO, MgO, SrO, and BaO. Because of the specific former-to-modifier ratio, the high-zirconia cast refractory material has an electric resistance of 200 Ω·cm or higher after standing for 12 hours at 1500° C., suffers no peeling in the heating process, and retains good stability toward repeated heating.

According to a preferred embodiment, the high-zirconia cast refractory material contains 85-92 wt % of $ZrO_2$, 6-12 wt % of $SiO_2$, 0.4 to less than 0.8 wt % of $Al_2O_3$, less than 0.02 wt % of $Na_2O$, 0.01-0.1 wt % of $K_2O$, 0.3-1.2 wt % of $B_2O_3$, 0.01-0.2 wt % of CaO, less than 0.3 wt % of BaO, less than 0.1 wt % of SrO, 0.05-0.2 wt % of $Y_2O_3$, and 0.3 wt % or less of $Fe_2O_3$ and $TiO_2$ together, but does not substantially contain CuO and $P_2O_5$ (less than 0.01 wt %). Moreover, it contains the foregoing components such that the molar ratio of Former to Modifier is from 25 to 100. Former is defined as the glass forming oxides such as $SiO_2$ and $B_2O_3$, and Modifier is defined as the glass modifying oxides such as $Na_2O$, $K_2O$, CaO, MgO, SrO, and BaO. Because of the specific former-to-modifier ratio, the high-zirconia cast refractory material has an electric resistance of 300 Ω·cm or higher after standing for 12 hours at 1500° C., suffers no peeling in the heating process, and retains good stability toward repeated heating.

The present inventors investigated the former-to-modifier ratio in more detail in order to elucidate the reason why the high-zirconia cast refractory material retains a stable high electric resistance over a long period of time at high temperatures, exhibits good stability toward the heating cycle (repeated heating and cooling), and possesses good resistance to peeling at the time of heating. The former-to-modifier ratio is a molar ratio of glass-forming components to glass-modifying components. The former includes oxides constituting the glass phase of the high-zirconia cast refractory material, and the latter includes a variety of oxides such as alkali metal oxides, alkaline earth metal oxides, and alumina. Incidentally, alumina, which is an intermediate product, is excluded from the former/modifier and evaluated separately.

For the high-zirconia cast refractory material to have a high electric resistance, it should contain a less amount of alkali metal oxides (particularly $Na_2O$) with a small ionic radius. Simple reduction of the $Na_2O$ content increases the electric resistance but does not provide an adequate surface residual stress to prevent cracking that occurs in the manufacturing process or in the heating process or that occurs due to an increase in permanent expansion coefficient as the result of zircon formation after heating cycle tests.

Therefore, the high-zirconia cast refractory material will have a high electric resistance as desired only when it contains a minimum amount of $Na_2O$ (which is greatly influential on electric resistance) and an adequate amount of $B_2O_3$ (necessary to prevent cracking in the manufacturing process) and $Al_2O_3$, $K_2O$, BaO, CaO, and SrO (important for glass stabilization), and it has an adequate former-to-modifier ratio.

It is presumed as follows that the glass phase is related with the residual stress that occurs while the high-zirconia cast refractory material is cooled after casting.

A situation is assumed in which the outer layer of the high-zirconia cast refractory material has solidified and the inner layer is about to solidify. Zirconia crystals undergo transformation at about 1000° C. in the cooling process. This transformation gives rise to stress, but the stress is relieved by the glass phase if the glass phase has a low viscosity for sufficient flowability at the transformation point. Therefore, stress due to transformation of zirconia crystals rarely affects the residual stress of the casting. In this case, residual stress occurs as cooling proceeds to such a degree that the inner layer does not flow any longer and thermal stress accumulates on account of the temperature difference between the outer layer and the inner layer. As the result, compressive stress occurs as residual stress in the surface of the high-zirconia cast refractory material.

By contrast, in the case where the glass phase has too high a viscosity to flow well in the neighborhood of the transformation point of zirconia crystals in the cooling process, the glass phase does not relieve sufficiently the stress resulting from the transformation of zirconia crystals, and the stress causes compressive force to the inner layer and tensile force to the outer layer. The residual stress in this case is the sum of the thermal stress, which arises from temperature difference between the inner layer and the outer layer as cooling proceeds further, and the foregoing stress which arises from transformation of zirconia crystals. Therefore, the stress in the surface of the high-zirconia cast refractory material is a smaller compressive stress or tensile stress than in the case where the glass phase has a low viscosity.

The foregoing was experimentally proved as follows. First, a solid glass sample is prepared from reagents fused in a platinum crucible such that it has the same composition as the glass phase in the refractory material according to Example 4 and Comparative Example 3 (given later). The composition of the glass phase is determined by EPM (X-ray microanalyzer). Then, the resulting glass sample is examined for glass transition point (Tg) by using a thermal dilatometer. The high zirconia cast refractory materials according to Example 4 and Comparative Example 3 are also examined for residual stress in the surface. The results of the experiments are given below.

The refractory material in Example 4 has a Tg of 890° C. and a tensile stress of 7 MPa as a residual stress in its surface.

Likewise, the refractory material in Comparative Example 3 has a Tg of 810° C. and a tensile stress of 23 MPa as a residual stress in its surface.

Incidentally, the measurement of residual stress is based on SOET VANCROMBURGGE method described in "Occurrence and Countermeasure of Residual Stress" by S. Yonetani, issued by Youkendo. Residual stress is measured at 6 points in the surface of a specimen measuring 100×300×300 mm, by using a strain gauge.

The glass has a viscosity of about $10^{13}$ to $10^{15}$ poise at its glass transition point (Tg). If the temperature rises above Tg, viscosity of glass decrease and the glass becomes fluid.

Consequently, glass having a high glass transition point (Tg) is highly viscous at high temperatures.

In other words, if the glass transition point (Tg) is about 810° C., the glass phase in the high-zirconia cast refractory material has a sufficiently low viscosity, and hence the stress arising from transformation of zirconia crystals will be relieved by the fluid glass and the high-zirconia cast refractory material will have a compressive stress as the residual stress in its surface.

By contrast, if the glass transition point (Tg) is about 890° C., the glass phase in the high-zirconia cast refractory material has a high viscosity at about 1000° C. and hence the stress arising from transformation of zirconia crystals will not be relieved sufficiently and the high-zirconia cast refractory material will have a compressive stress in its inner layer and a tensile stress in its outer layer.

The adequate high-zirconia cast refractory material should have a residual stress in its surface which ranges from a compressive stress of 20 MPa to a tensile stress of 30 MPa.

In the present invention, the former-to-modifier ratio is as important as the individual contents of alkali metal oxides and alkaline earth metal oxides. Former denotes glass-forming oxides, which include $SiO_2$ and $B_2O_3$, and modifier denotes glass-modifying oxides, which include $Na_2O$, $K_2O$, $CaO$, $MgO$, $SrO$, and $BaO$.

The molar ratio of former to modifier is an index to represent the characteristic properties of the glass phase in the high-zirconia refractory material.

An adequate former-to-modifier ratio permits the high-zirconia cast refractory material to have a desirable electric resistance, good glass stability (after repeated heating), and resistance to peeling at the time of heating.

In other words, the larger the former-to-modifier ratio (and hence the more the silica content), the higher the electric resistance and the better the heating cycle stability. Moreover, the high-zirconia cast refractory material with a high former-to-modifier ratio tends to have a tensile stress as residual stress in its surface and hence is less vulnerable to peeling at the time of heating.

However, an excessively high former-to-modifier ratio leads to a situation in which the glass phase cannot absorb the stress arising from transformation of zirconia in the manufacturing process.

By contrast, as the former-to-modifier ratio decreases, the silica content relatively decreases and hence the electric resistance decreases. In the case of low $Al_2O_3$ content, the permanent expansion coefficient increases after repeated heating and zircon is liable to occur. In the case where the $Al_2O_3$ content is about 0.5% and the $SiO_2$ content is 4-5%, the permanent expansion coefficient increases. In this case, the refractory material tends to have a compressive stress as residual stress in its surface, and this leads to easy peeling at the time of heating.

It is desirable to control the former-to-modifier ratio within a range of 20 to 100.

The more desirable range of the former-to-modifier ratio is 25 to 100.

With the former-to-modifier ratio controlled within the above-mentioned range, the high-zirconia cast refractory material has a high electric resistance, a good stability toward heating cycle, and a good resistance to peeling at the time of heating.

If the former-to-modifier ratio is smaller than 20, the refractory material does not have a sufficiently high electric resistance and is poor in stability toward repeated heating.

If the former-to-modifier ratio is larger than 100, the refractory material has a high electric resistance but is liable to cracking in the manufacturing process.

DESCRIPTION OF THE PREFERRED EMBODIMENTS

Figure 1:
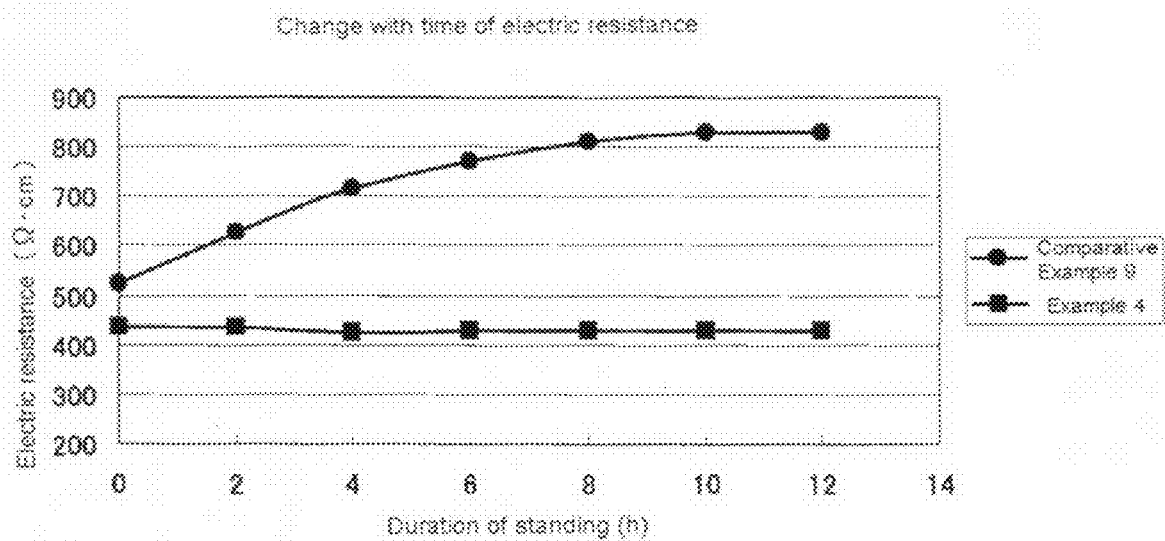
FIG. 1 is a diagram showing how the high-zirconia cast refractory material changes in electric resistance with time.

FIG. 1 shows changes with time in electric resistance that occur after the samples in Example 4 and Comparative Example 9 (shown in Tables 1 and 2) have been held at 1500° C.

It is noted from FIG. 1 that the sample in Example 4 remains stable in electric resistance but the sample in Comparative Example 9 increases in electric resistance with the lapse of time.

Figure 2:
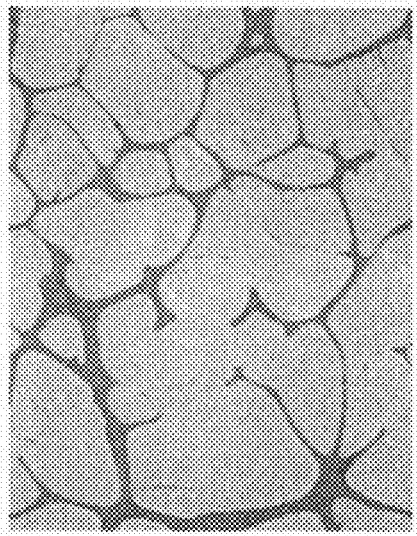
FIG. 2 is a microphotograph of the sample in Example 4 which was taken after measurement of electric resistance.

FIG. 2 is a microphotograph of the sample in Example 4 which was taken after the sample had been held at 1500° C. for 12 hours. The glass phase (in elongated pattern) is observed in grain boundaries between granular zirconia crystals.

Figure 3:
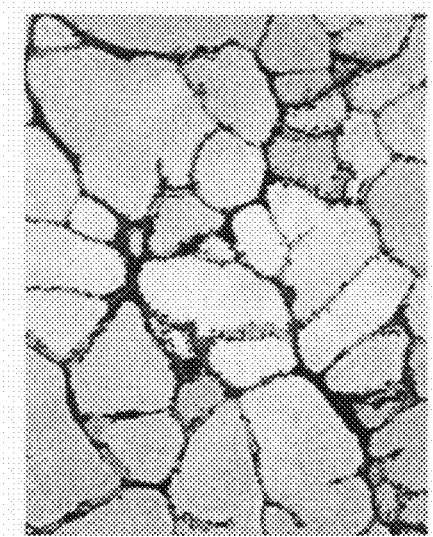
FIG. 3 is a microphotograph of the sample in Comparative Example 9 which was taken after measurement of electric resistance.

FIG. 3 is a microphotograph of the sample in Comparative Example 9 which was taken after the sample had been held at 1500° C. for 12 hours. The glass phase, which contains small grainy crystals of zircon, is observed in grain boundaries between granular zirconia crystals.

It is noted that the sample in Example 4 remains stable in electric resistance without zircon formation even after it has been held at 1500° C. for 12 hours and it retains a small permanent expansion coefficient without zircon formation after heating cycle tests.

By contrast, the sample in Comparative Example 9, which contains $P_2O_5$, is liable to form zircon at the time of heating. It also increases in electric resistance because zircon formation continues while it is held at 1500° C.

The continued zircon formation causes the sample to increase in permanent expansion coefficient after heating cycle tests, and the sample suffers powdering.

Figure 4:
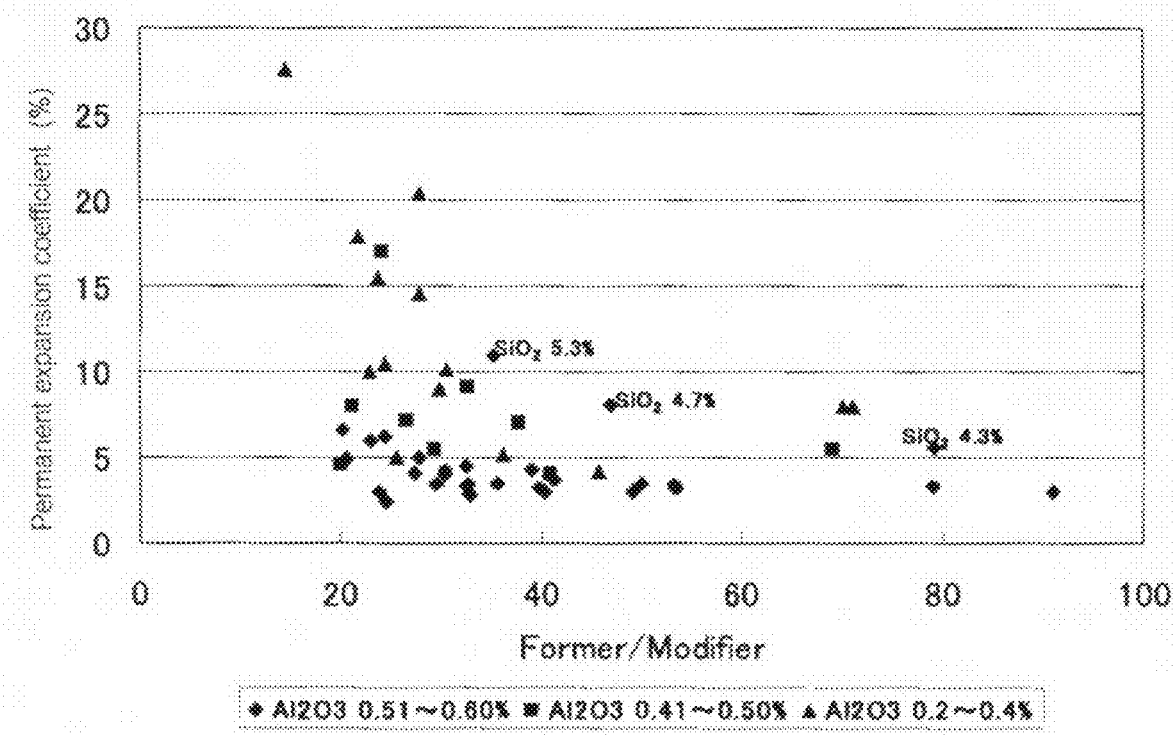
FIG. 4 is a diagram showing the relation between the former-to-modifier ratio and the permanent expansion coefficient measured after heating cycle tests.

FIG. 4 shows the relation between the former-to-modifier ratio and the permanent expansion coefficient measured after heating cycle tests.

It is noted that the increasing former-to-modifier ratio is accompanied by the decreasing permanent expansion coefficient.

However, with the $Al_2O_3$ content less than 0.4%, the permanent expansion coefficient tends to increase as the former-to-modifier ratio becomes smaller than 40.

On the other hand, with the $Al_2O_3$ content 0.4% or larger, the permanent expansion coefficient decreases, and with the $Al_2O_3$ content 0.5% or larger, the permanent expansion coefficient remains stable (at 5% or lower) at any value of former-to-modifier ratio.

The foregoing suggests that the permanent expansion coefficient depends greatly on the $Al_2O_3$ content.

Figure 5:
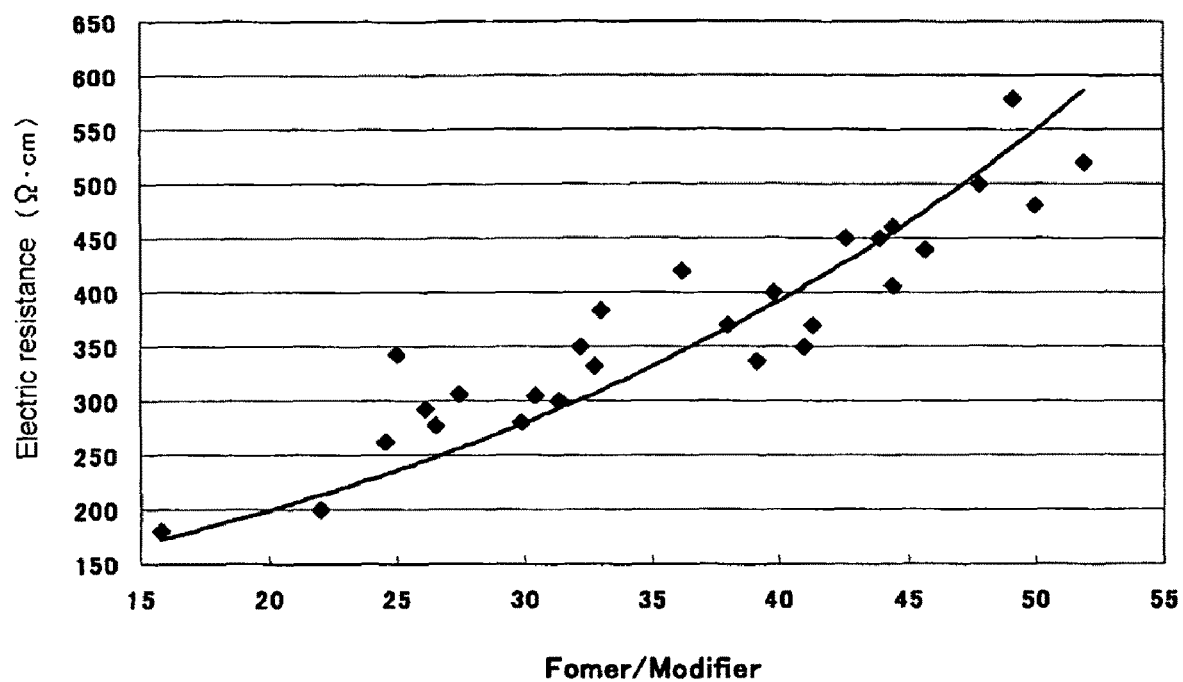
FIG. 5 is a diagram showing the relation between the former-to-modifier ratio and the electric resistance at 1500° C.

FIG. 5 shows a relation between the former-to-modifier ratio and the electric resistance at 1500° C. It is noted that the electric resistance is proportional to the former-to-modifier ratio.

With the former-to-modifier ratio over 50, the electric resistance at 1500° C. approaches 500 Ω·cm.

However, with the former-to-modifier ratio being 20 or below, the electric resistance at 1500° C. is 200 Ω·cm or lower.

The high-zirconia cast refractory material according to the present invention is composed of various components as explained in the following.

$ZrO_2$: The content of $ZrO_2$ should be from 85 to 95 wt %, preferably from 85 to 92 wt %. A lower content than 85 wt % is detrimental to corrosion resistance and a higher content than 95 wt % is excessive relative to other components, which will cause cracking. The refractory material containing only 85 wt % of $ZrO_2$ will find use for electric melting furnaces without causing corrosion if it has a large electric resistance.

$SiO_2$: According to the present invention, $SiO_2$ constitutes the former. The content of $SiO_2$ should be from 4 to 12 wt %, preferably from 6 to 12 wt %. With a smaller content than 4 wt %, $SiO_2$ does not form the glass phase sufficiently in the refractory material, and the resulting refractory material increases in permanent expansion coefficient after heating cycle tests. The higher the $SiO_2$ content, the lower the permanent expansion coefficient and the higher the electric resistance. However, excess $SiO_2$ more than 12 wt % makes the refractory material poor in resistance to corrosion by molten glass and causes the glass phase to flow out of the refractory material at high temperatures. As with $ZrO_2$, $SiO_2$ has no effect on corrosion resistance if $SiO_2$ content is below 12 wt % and the refractory material has a high electric resistance.

$B_2O_3$: This component constitutes the former. The content of $B_2O_3$ should be from 0.1 to 1.5 wt %, preferably from 0.3 to 1.2 wt %. With a $B_2O_3$ content less than 0.1 wt %, the refractory material is liable to tear cracking in the manufacturing process. With a $B_2O_3$ content more than 1.5 wt %, the refractory material has as large permanent expansion coefficient as exceeding 30% (and hence becomes liable to powdering) after heating cycle tests.

$Al_2O_3$: The content of $Al_2O_3$ should be from 0.1 to less than 0.8 wt %, preferably from 0.4 to less than 0.8 wt %.

$Al_2O_3$ makes the melt more fluid for easy casting. It also prevents $ZrO_2$ (constituting the refractory material) from dissolving into the glass phase and prevents zircon from forming in the glass phase. With an $Al_2O_3$ content less than 0.1 wt %, the refractory material has a permanent expansion coefficient exceeding 30% after heating cycle tests and is poor in stability toward repeated heating.

If the former-to-modifier ratio is 40 or smaller, the $Al_2O_3$ content should preferably be no less than 0.5 wt %. An $Al_2O_3$ content being 0.8 wt % or more contributes to stability toward repeated heating but greatly reduces the electric resistance.

In addition, $Al_2O_3$ increases the surface compressive force of the high-zirconia cast refractory material.

$Na_2O$: This component is a constituent of the modifier. The content of $Na_2O$ should be less than 0.04 wt %, preferably less than 0.02 wt %. With a content being 0.04 wt % or more, the refractory material has a very low electric resistance.

$Na_2O$ also increases the compressive stress of the refractory material.

$K_2O$: This component is a constituent of the modifier. The content of $K_2O$ should be from 0.01 to 0.15 wt %, preferably from 0.01 to 0.1 wt %. $K_2O$ is essential in the refractory material in which the content of $Na_2O$ is limited. If the $K_2O$ content is less than 0.01 wt % (or substantially zero), the melt of the refractory material does not readily flow at the time of casting (which results in dimensionally inaccurate products) even though it contains alkaline earth metal oxides as the stabilizer of the glass phase. In addition, with a low $K_2O$ content, the refractory material has a very large permanent expansion coefficient after heating cycle tests and is poor in stability toward the repeated heating.

If the $K_2O$ content exceeds 0.15 wt % and the former-to-modifier ratio is small, the refractory material does not have a sufficient electric resistance. Even though the former-to-modifier ratio is adequate, the low $K_2O$ content makes the refractory material liable to tear cracking upon one-side heating and poor in stability toward repeated heating. Like $Na_2O$, $K_2O$ increases the compressive stress of the refractory material.

CaO: This component is a constituent of the modifier. The content of CaO should be from 0.01 to 0.2 wt %. CaO controls the viscosity of glass to stabilize the glass phase.

Having a comparatively small molecular weight among alkaline earth metal oxides, CaO barely alters the network structure of Si—O—Si linkage of $SiO_2$ as a constituent of the former. Hence, it helps the refractory material keep the compact structure.

CaO exists as an impurity in the zirconia raw material, and it also exists in LCD glass.

Therefore, it does not affect the characteristic properties of the high-zirconia cast refractory material even though the glass phase therein is replaced by LCD glass at the time of glass melting.

For the reasons mentioned above, CaO is an essential component in the present invention.

Without CaO, the refractory material has a large tensile stress and is liable to peeling at the time of one-side heating.

However, with a CaO content exceeding 0.2 wt %, the refractory material has a large permanent expansion coefficient after repeated heating and becomes powdered in an extreme case.

BaO: This component is a constituent of the modifier; it controls the viscosity of the glass phase.

The content of BaO should be 0.4 wt % or less, preferably 0.3 wt % or less. With a BaO content in excess of 0.4 wt %, the refractory material is low in electric resistance and has a high permanent expansion coefficient after heating cycle tests, which leads to low stability toward repeated heating.

SrO: This component is a constituent of the modifier. The content of SrO should be less than 0.2 wt %.

SrO produces a significant effect of preventing cracking in the manufacturing process and lowering the viscosity of the glass phase. With an SrO content being 0.2 wt % or more, the refractory material does not have a sufficient electric resistance.

MgO: This component is a constituent of the modifier. It produces the same effect as CaO. The content of MgO should be 0.2 wt % or less.

MgO exists is an impurity in the zirconia raw material, but its amount is comparatively small. With an MgO content in excess of 0.2 wt %, the refractory material has a high permanent expansion coefficient after heating cycle tests, which leads to low stability toward repeated heating.

The refractory material should contain at least one species of the above-mentioned alkaline earth metal oxides (CaO, BaO, SrO, and MgO, with CaO being essential) so that the glass phase is stabilized.

The total amount of CaO, BaO, SrO, and MgO should preferably be less than 0.7 wt %. With a total amount in excess of 0.7 wt %, the refractory material has a low electric resistance and also has a permanent expansion coefficient higher than 10% after heating cycle tests.

$Y_2O_3$: The content of $Y_2O_3$ should be from 0.05 to 0.4 wt %, preferably from 0.05 to 0.2 wt %.

$Y_2O_3$ exists as an impurity in the zirconia raw material. With a $Y_2O_3$ content in excess of 0.4 wt %, the refractory material has a high permanent expansion coefficient after heating cycle tests, which leads to low stability toward repeated heating and a low electric resistance.

The total content of $Fe_2O_3$ and $TiO_2$ should be 0.3 wt % or less. Both $Fe_2O_3$ and $TiO_2$ exist as impurities in the raw material, but their content should be 0.3 wt % or less because they cause cracking in the manufacturing process.

$P_2O_5$ and CuO: These components are not substantially contained in the refractory material of the present invention.

These components in coexistence with $B_2O_3$ form a low-melting glass which greatly deteriorates the chemical durability of the refractory material. $P_2O_5$ makes the refractory material remarkably poor in stability toward repeated heating. Moreover, raw materials containing these components are highly hygroscopic and hardly give compact refractory materials.

CuO makes the refractory material less subject to cracking but colors the molten glass; hence its substantial absence is desirable.

In the present invention, the content of any component less than 0.01 wt % (varying depending on the analytical method and the accuracy of analytical instruments) is expressed as being substantially absent.

EXAMPLES

Examples 1 to 11 and Comparative Examples 1 to 16 demonstrate the samples of high-zirconia cast refractory materials. The samples were prepared in the usual way as follows.

First, a zirconia raw material is prepared by desiliconizing zircon sand. The zirconia raw material is incorporated with $SiO_2$, $Al_2O_3$, $Na_2O$, $B_2O_3$, and other components in a prescribed ratio. The resulting mixture is fused in an arc electric furnace and the melt is cast into a mold. The casting is annealed together with the mold to room temperature in alumina powder.

The casting mold is a graphite one measuring 100×300×350 mm (inside), with a riser measuring 140×235×350 mm (inside) integrally attached to the upper part thereof. The cast is cut at a position 50 mm away from the riser, so that a sample measuring 100×300×300 mm is obtained for evaluation.

After annealing, the cast is removed from alumina powder and cut to give the desired high-zirconia cast refractory material. The thus obtained product is examined for surface cracking.

The samples of the high-zirconia cast refractory materials in Examples 1 to 11 have the composition and characteristic properties as shown in Table 1.

The samples of the high-zirconia cast refractory materials in Comparative Examples 1 to 16 have the composition and characteristic properties as shown in Table 2.

The content of each component shown in Tables 1 and 2 is expressed in terms of wt %. The methods for determination of components are flame photometry (for $K_2O$ and $Na_2O$), absorptiometry (for $P_2O_5$), and ICP (for others). Other methods than them may also be employed.

Analyses are performed on 10 spherical specimens (30 mm in diameter) obtained from the melt at the time of casting, and the analytical values of these specimens are used as those of the high-zirconia cast refractory material.

The one-side heating test is conducted as follows. The sample measuring 100×300×300 mm is placed in an electric furnace in such a way that the side measuring 300×300 mm faces inward and the opposite side is exposed to atmospheric air. The sample is heated up to 1000° C. at a rate of 100° C. per hour. The sample is examined for cracking during heating.

The heating cycle test is conducted as follows. A specimen measuring 50×50×50 mm is taken out, which is a bottom-side part of the sample block measuring 100×300×300 mm) which appears after the riser has been cut off. The specimens are placed in an electric furnace and heated up to 800° C. at a rate of 3° C. per minute and kept at 800° C. for 1 hour. Then, the specimens are heated up to 1200° C. at a rate of 3° C. per minute and kept at 1200° C. for 1 hour. Then, the specimens are cooled to 800° C. at a rate of 3° C. The cycle of heating and cooling between 800° C. and 1200° C. is repeated 45 times. After slow cooling, the specimens are examined for cracking and powdering. In addition, the specimens are examined for volume change before and after the heating cycle test to calculate the permanent expansion coefficient.

The permanent expansion coefficient measured in the heating cycle test may exceed 10% if zircon forms.

And, the amount of zircon is proportional to the permanent expansion coefficient. Those specimens in Comparative Examples (shown in Table 2), which have the permanent expansion coefficient in excess of 10% and permit the formation of zircon in the heating cycle test, give an electric resistance increasing with time as with the specimen in Comparative Example 9 shown in FIG. 2. In other words, they are poor in stability toward change with time.

The electric resistance is measured in the following manner by the four-terminal method according to JIS R1650-2.

A sample block measuring 100×300×300 mm is prepared. A drill core, 100 mm long and 19 mm in diameter, is taken out of the 300×300 mm side of the sample block at a position 50 mm away from the end, at which the riser has been cut off, and 50 mm away from the lateral side.

The drill core is cut at a position 5 mm away from its end, and a specimen for measurement (30 mm long) is cut out of it. The specimen for measurement has grooves cut in its surface at positions 5 mm away from both ends. It is ultrasonically cleaned and dried in a drier.

After drying, both ends and grooves are evenly coated with platinum paste, and this step is followed by drying and heating at 1000° C. for 1 hour. After cooling, both ends of the specimen are provided with platinum plates, and the grooves are wound with platinum wires. These platinum plates and wires function as terminals. The specimen is given a constant voltage from a function generator (AC 60 Hz), and measurements are made of the voltage of the specimen and the voltage of the standard resistor equivalent to the resistance of the specimen. Thus measured voltage is converted into the electric resistance of the specimen. The specimen is heated up to 1500° C. at a rate of 4° C. per minute and kept at 1500° C. for 12 hours.

If the electric resistance remains stable during heating, the average value of electric resistance measured after holding at 12 hours is regarded as the electric resistance at 1500° C.

Also in the case where the specimen it heated up to 1650° C., the average value of electric resistance measured after holding at 12 hours is regarded as the electric resistance at 1650° C.

Table 1 lists Examples 1 to 11 conforming to the present invention.

Table 2 lists Comparative Examples 1 to 16.

Comparative Example 1 is equivalent to Example disclosed in Patent Document 6. Although nothing is mentioned in Patent Document 6 about BaO and $K_2O$, the sample of the disclosed example is considered to be free of $K_2O$ and BaO in view of the $Y_2O_3$ content and the total amount of constituents and the fact that zirconia raw materials usually contain about 0.2 wt % of $Y_2O_3$ as an impurity.

The sample in Comparative Example 1 contains a small amount of $Na_2O$ but a large amount of $Al_2O_3$ and hence it does not have a high electric resistance as desired.

Moreover, lacking $K_2O$ and BaO, it has a high permanent expansion coefficient after heating cycle tests and it is poor in stability toward repeated heating.

The sample in Comparative Example 2 is limited in the amount of $Al_2O_3$ and $B_2O_3$. It suffers cracking in the manufacturing process. It has a high electric resistance, but it suffers cracking and powdering after heating cycle tests.

The sample in Comparative Example 3 contains much $Al_2O_3$ and $Na_2O$ but no $B_2O_3$. It suffers cracking in the manufacturing process and has a low electric resistance.

The sample in Comparative Example 4 contains much $B_2O_3$. It has a low former-to-modifier ratio and also has a low electric resistance. In addition, it has a high permanent expansion coefficient after heating cycle tests.

The sample in Comparative Example 5 contains much $K_2O$. It has a low former-to-modifier ratio and hence has a low electric resistance. In addition, it has a high permanent expansion coefficient after heating cycle tests and is poor in stability toward repeated heating.

The sample in Comparative Example 6 contains much $ZrO_2$ and little $SiO_2$. It has a low electric resistance and has a high permanent expansion coefficient after heating cycle tests and is poor in stability toward repeated heating.

The sample in Comparative Example 7 contains much $Fe_2O_3$ and $TiO_2$ but no $K_2O$. It has a high viscosity in the manufacturing process and gives a concave product. It has a high electric resistance but it also has a high permanent expansion coefficient after heating cycle tests and suffers powering and is poor in stability toward repeated heating.

The sample in Comparative Example 8 contains much SrO and $Y_2O_3$. It has a low electric resistance and is poor in stability toward repeated heating.

The sample in Comparative Example 9 contains much $SiO_2$ and little $ZrO_2$, and $P_2O_5$. It has a high electric resistance but suffers zircon formation and lacks stability at the time of measurement. It also has a high permanent expansion coefficient after heating cycle tests.

The sample in Comparative Example 10 is equivalent to the one disclosed in Patent Document 4. It contains much $Na_2O$, MgO, and BaO and also contains $P_2O_5$, with the total amount of CaO, MgO, BaO, and SrO being more than 0.7 wt %. It has a small former-to-modifier ratio and hence it has a low electric resistance and a high permanent expansion coefficient after heating cycle tests, and is poor in stability toward repeated heating.

The sample in Comparative Example 11 is equivalent to the one disclosed in Patent Document 3. It contains much $Na_2O$ and some BaO, SrO, and MgO. Because of its high $Na_2O$ content, it has a low electric resistance.

The sample in Comparative Example 12 contains a large amount of CaO. It has a low former-to-modifier ratio, a low electric resistance, and a high permanent expansion coefficient after heating cycle tests and is poor in stability toward repeated heating.

The sample in Comparative Example 13 is equivalent to the one disclosed in Example of Patent Document 1. It does not contain CaO, $Na_2O$, and MgO.

It has a high electric resistance but suffers cracking at the time of one-side heating on account of its high tensile stress. It also has a high permanent expansion coefficient after heating cycle tests and suffers powdering.

The sample in Comparative Example 14 is equivalent to the one disclosed in Example of Patent Document 2. It contains much $Al_2O_3$ but contains no $Na_2O$ and $K_2O$. It has a high electric resistance but lacks stability toward repeated heating.

The sample in Comparative Example 15 is equivalent to the one disclosed in Example of Patent Document 5. It contains much $Na_2O$ but contains no alkaline earth metal oxides.

It has a high electric resistance but suffers cracking at the time of one-side heating and lacks stability toward repeated heating.

The sample in Comparative Example 16 contains oxides within the range specified in the present invention but has an excessively high former-to-modifier ratio. It has an adequate electric resistance and good stability toward repeated heating, but it suffers cracking in the manufacturing process.

TABLE 1

| | Example | 1 | 2 | 3 | 4 | 5 | 6 | 7 | 8 | 9 | 10 | 11 |
|---|---|---|---|---|---|---|---|---|---|---|---|---|
| Components (wt %) | $ZrO_2$ | 85.2 | 90.0 | 90.1 | 91.6 | 92.2 | 94.5 | 85.7 | 92.6 | 90.1 | 90.2 | 86.8 |
| | $SiO_2$ | 11.80 | 8.00 | 7.80 | 6.40 | 6.85 | 4.20 | 10.95 | 5.50 | 7.99 | 7.70 | 11.50 |
| | $Al_2O_3$ | 0.78 | 0.55 | 0.53 | 0.40 | 0.10 | 0.40 | 0.75 | 0.41 | 0.32 | 0.55 | 0.55 |
| | $Na_2O$ | <0.01 | 0.03 | <0.01 | <0.01 | <0.01 | <0.01 | 0.02 | <0.01 | <0.01 | <0.01 | <0.01 |
| | $B_2O_3$ | 1.10 | 0.50 | 0.50 | 0.45 | 0.50 | 0.20 | 1.40 | 0.50 | 0.60 | 0.60 | 0.60 |
| | $K_2O$ | 0.04 | 0.15 | 0.01 | 0.10 | 0.09 | 0.03 | 0.10 | 0.05 | 0.05 | 0.05 | 0.06 |
| | BaO | 0.17 | 0.20 | 0.38 | 0.20 | 0.08 | <0.01 | 0.25 | 0.10 | 0.01 | 0.15 | 0.10 |
| | CaO | 0.05 | 0.08 | 0.18 | 0.09 | 0.01 | 0.02 | 0.05 | 0.02 | 0.10 | 0.15 | 0.02 |
| | $Fe_2O_3 + TiO_2$ | 0.25 | 0.04 | 0.20 | 0.23 | 0.12 | 0.20 | 0.23 | 0.20 | 0.20 | 0.20 | 0.12 |
| | SrO | 0.18 | 0.02 | 0.05 | 0.02 | <0.01 | 0.01 | 0.02 | 0.04 | <0.01 | 0.02 | 0.02 |
| | $Y_2O_3$ | 0.10 | 0.14 | 0.05 | 0.15 | 0.05 | 0.12 | 0.07 | 0.18 | 0.35 | 0.15 | 0.13 |
| | MgO | 0.10 | 0.01 | 0.01 | 0.01 | <0.01 | 0.10 | 0.17 | 0.02 | 0.03 | 0.01 | 0.01 |
| | CuO | <0.01 | <0.01 | <0.01 | <0.01 | <0.01 | <0.01 | <0.01 | <0.01 | <0.01 | <0.01 | <0.01 |
| | $P_2O_5$ | <0.01 | <0.01 | <0.01 | <0.01 | <0.01 | <0.01 | <0.01 | <0.01 | <0.01 | <0.01 | <0.01 |
| Former/Modifier | | 31.7 | 26.8 | 20.6 | 25.6 | 71.3 | 22.4 | 49.4 | 40.8 | 45.4 | 29.6 | 95.6 |
| Cracking in the manufacturing process | | No | No | No | No | No | No | No | No | No | No | No |
| Electric resistance after heating at 1500° C. (Ω·cm) | | 359 | 273 | 343 | 425 | 491 | 200 | 484 | 311 | 339 | 337 | 750 |
| Electric resistance after heating at 1650° C. (Ω·cm) | | 169 | 129 | 161 | 200 | 231 | 94 | 228 | 146 | 159 | 158 | 353 |

TABLE 1-continued

| Example | 1 | 2 | 3 | 4 | 5 | 6 | 7 | 8 | 9 | 10 | 11 |
|---|---|---|---|---|---|---|---|---|---|---|---|
| Cracking due to One-side heating test | No | No | No | No | No | No | No | No | No | No | No |
| Cracking and powdering due to heating cycle tests | No | No | No | No | No | No | No | No | No | No | No |
| Permanent expansion coefficient (%) | 3.5 | 5.0 | 4.9 | 5.0 | 8.0 | 10.0 | 3.0 | 4.0 | 10.2 | 3.5 | 3.3 |

TABLE 2

| | Comparitive Example | 1 | 2 | 3 | 4 | 5 | 6 | 7 | 8 | 9 |
|---|---|---|---|---|---|---|---|---|---|---|
| Components (wt %) | $ZrO_2$ | 92.5 | 91.4 | 92.5 | 91.2 | 93.7 | 95.5 | 90.0 | 92.1 | 84.5 |
| | $SiO_2$ | 5.15 | 7.30 | 4.80 | 5.45 | 4.14 | 3.00 | 8.28 | 5.50 | 12.48 |
| | $Al_2O_3$ | 0.90 | 0.05 | 1.20 | 0.40 | 0.55 | 0.30 | 0.54 | 0.53 | 0.70 |
| | $Na_2O$ | 0.02 | 0.01 | 0.40 | 0.04 | 0.03 | 0.00 | 0.01 | 0.03 | <0.01 |
| | $B_2O_3$ | 0.50 | 0.05 | <0.01 | 1.70 | 0.50 | 0.40 | 0.38 | 0.48 | 0.60 |
| | $K_2O$ | <0.01 | 0.03 | 0.05 | 0.10 | 0.25 | 0.06 | <0.01 | 0.05 | 0.06 |
| | BaO | <0.01 | 0.20 | 0.25 | 0.20 | 0.08 | 0.18 | 0.20 | 0.00 | 0.20 |
| | CaO | 0.18 | 0.18 | 0.12 | 0.11 | 0.10 | 0.07 | 0.05 | 0.10 | 0.05 |
| | $Fe_2O_3 + TiO_2$ | 0.25 | 0.20 | 0.20 | 0.23 | 0.20 | 0.20 | 0.34 | 0.20 | 0.25 |
| | SrO | <0.01 | <0.01 | 0.02 | 0.10 | <0.01 | <0.01 | 0.02 | 0.22 | <0.01 |
| | $Y_2O_3$ | 0.18 | 0.18 | 0.16 | 0.13 | 0.18 | 0.17 | 0.12 | 0.42 | 0.15 |
| | MgO | 0.02 | 0.01 | 0.03 | 0.01 | 0.01 | <0.01 | 0.01 | <0.01 | 0.03 |
| | CuO | <0.01 | <0.01 | <0.01 | <0.01 | <0.01 | <0.01 | <0.01 | <0.01 | <0.01 |
| | $P_2O_5$ | <0.01 | <0.01 | <0.01 | <0.01 | <0.01 | <0.01 | <0.01 | <0.01 | 0.35 |
| Former/Modifier | | 23.0 | 23.3 | 8.7 | 18.6 | 13.4 | 19.0 | 54.4 | 20.0 | 60.6 |
| Cracking in the manufacturing process | | No | Yes | Yes | No | No | No | deform | No | No |
| Electric resistance after heating at 1500° C. (Ω · cm) | | 185 | 377 | 30 | 70 | 80 | 160 | 507 | 120 | 820 |
| Electric resistance after heating at 1650° C. (Ω · cm) | | 87 | 177 | — | — | — | — | 228 | — | 270 |
| Cracking due to One-side heating test | | No | — | — | No | No | No | — | No | No |
| Cracking and powdering due to heating cycle tests | | Yes | Yes | — | Yes | Yes | Yes | Yes | Yes | Yes |
| Permanent expansion coefficient (%) | | 20 | 50 | — | 35 | 20 | 23 | 50 | 28 | 15 |

| | Comparitive Example | 10 | 11 | 12 | 13 | 14 | 15 | 16 |
|---|---|---|---|---|---|---|---|---|
| Components (wt %) | $ZrO_2$ | 93.2 | 90.5 | 90.2 | 91.0 | 92.0 | 90.3 | 87.5 |
| | $SiO_2$ | 4.10 | 7.30 | 7.40 | 6.80 | 5.40 | 7.80 | 11.00 |
| | $Al_2O_3$ | 0.45 | 0.72 | 0.45 | 0.10 | 1.00 | 0.60 | 0.55 |
| | $Na_2O$ | 0.07 | 0.06 | 0.01 | <0.01 | <0.01 | 0.06 | <0.01 |
| | $B_2O_3$ | 0.50 | 0.30 | 0.80 | 0.50 | 0.50 | 0.50 | 0.80 |
| | $K_2O$ | 0.06 | 0.07 | 0.06 | 0.25 | <0.01 | 0.07 | 0.06 |
| | BaO | 0.45 | 0.20 | 0.25 | 0.25 | 0.20 | <0.01 | 0.10 |
| | CaO | 0.15 | 0.13 | 0.25 | <0.01 | 0.10 | <0.01 | 0.01 |
| | $Fe_2O_3 + TiO_2$ | 0.21 | 0.23 | 0.25 | 0.23 | 0.10 | 0.20 | 0.12 |
| | SrO | 0.13 | 0.03 | 0.15 | <0.01 | 0.10 | <0.01 | <0.01 |
| | $Y_2O_3$ | 0.15 | 0.18 | 0.17 | 0.17 | 0.15 | 0.20 | 0.13 |
| | MgO | 0.21 | 0.01 | <0.01 | <0.01 | <0.01 | <0.01 | <0.01 |
| | CuO | <0.01 | <0.01 | <0.01 | <0.01 | <0.01 | <0.01 | <0.01 |
| | $P_2O_5$ | 0.06 | <0.01 | <0.01 | <0.01 | <0.01 | <0.01 | <0.01 |
| Former/Modifier | | 5.4 | 21.3 | 15.8 | 28.1 | 24.0 | 78.7 | 130.8 |
| Cracking in the manufacturing process | | No | No | No | No | No | No | Yes |
| Electric resistance after heating at 1500° C. (Ω · cm) | | 85 | 180 | 180 | 300 | 271 | 200 | 740 |
| Electric resistance after heating at 1650° C. (Ω · cm) | | — | 75 | 85 | 132 | 130 | 94 | 320 |
| Cracking due to One-side heating test | | No | No | No | Yes | No | Yes | — |
| Cracking and powdering due to heating cycle tests | | Yes | No | Yes | Yes | Yes | Yes | No |
| Permanent expansion coefficient (%) | | 35 | 5 | 30 | 35 | 15 | 13 | 3 |

What is claimed is:

1. A high-zirconia cast refractory material which comprises:
   85-95 wt % of $ZrO_2$,
   0.1 to less than 0.8 wt % of $Al_2O_3$,
   glass-forming oxides including 4-12 wt % of $SiO_2$ and 0.1-1.5 wt. % of $B_2O_3$,
   glass-modifying oxides including less than 0.04 wt % of $Na_2O$, 0.01-0.15 wt % of $K_2O$, 0.01-0.2 wt % of CaO, less than 0.4 wt % of BaO, and less than 0.2 wt % of SrO,
   0.05-0.4 wt % of $Y_2O_3$,
   0.3 wt % or less of total content of $Fe_2O_3$ and $TiO_2$,
   less than 0.01 wt. % CuO, and
   less than 0.01 wt % $P_2O_5$,
   wherein the molar ratio of the glass-forming oxides to the glass-modifying oxides is 20-100, and
   wherein said refractory material has an electric resistance of at least 200 Ω·cm after standing for 12 hours at 1500° C.

2. A high-zirconia cast refractory material which comprises:
   85-92 wt % of $ZrO_2$,
   0.4 to less than 0.8 wt % of $Al_2O_3$,
   glass-forming oxides including 6-12 wt % of $SiO_2$ and 0.3-1.2 wt. % of $B_2O_3$,
   glass-modifying oxides including less than 0.02 wt % of $Na_2O$, 0.01-0.1 wt % of $K_2O$, 0.01-0.2 wt % of CaO, less than 0.3 wt % of BaO, less than 0.1 wt % of SrO,
   0.05-0.2 wt % of $Y_2O_3$,
   0.3 wt % or less of total content of $Fe_2O_3$ and $TiO_2$,
   less than 0.01 wt % CuO, and
   less than 0.01 wt % $P_2O_5$,
   wherein the molar ratio of the glass-forming oxides to the glass-modifying oxides is 25-100, and
   and wherein said refractory material has an electric resistance of at least 300 Ω·cm after standing for 12 hours at 1500° C.

3. The high-zirconia cast refractory material as defined in claim 1, which has an electric resistance of 90 Ω·cm or higher after standing for 12 hours at 1650° C.

4. The high-zirconia cast refractory material as defined in claim 2, which has an electric resistance of 90 Ω·cm or higher after standing for 12 hours at 1650° C.

5. The high-zirconia cast refractory material as defined in claim 1, which has an electric resistance of 150 Ω·cm or higher after standing for 12 hours at 1650° C.

6. The high-zirconia cast refractory material as defined in claim 2, which has an electric resistance of 150 Ω·cm or higher after standing for 12 hours at 1650° C.

7. The high-zirconia cast refractory material as defined in claim 1, which has a permanent expansion coefficient being 10% or lower after heating cycle tests.

8. The high-zirconia cast refractory material as defined in claim 2, which has a permanent expansion coefficient being 10% or lower after heating cycle tests.

9. The high-zirconia cast refractory material as defined in claim 1, which has a permanent expansion coefficient being 5% or lower after heating cycle tests.

10. The high-zirconia cast refractory material as defined in claim 2, which has a permanent expansion coefficient being 5% or lower after heating cycle tests.

* * * * *